United States Patent
Paduroiu

(10) Patent No.: US 11,347,571 B1
(45) Date of Patent: May 31, 2022

(54) SUB-ROUTING KEY SPLITS IN SCALING DISTRIBUTED STREAMING DATA STORAGE

(71) Applicant: EMC IP Holding Company LLC, Hopkinton, MA (US)

(72) Inventor: Andrei Paduroiu, Bellevue, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/205,149

(22) Filed: Mar. 18, 2021

(51) Int. Cl.
*G06F 9/54* (2006.01)

(52) U.S. Cl.
CPC ................... *G06F 9/542* (2013.01)

(58) Field of Classification Search
CPC ......... G06F 9/4812; G06F 9/542; H04L 29/06
USPC ....................................................... 719/318
See application file for complete search history.

(56) References Cited

U.S. PATENT DOCUMENTS

| | | | |
|---|---|---|---|
| 10,095,613 B2 * | 10/2018 | Jo | ...................... G06F 12/0862 |
| 10,944,807 B2 | 3/2021 | Paduroiu | |
| 2018/0332365 A1 | 11/2018 | Kaitchuck et al. | |

* cited by examiner

*Primary Examiner* — Andy Ho

(74) *Attorney, Agent, or Firm* — Amin, Turocy & Watson, LLP

(57) ABSTRACT

A streaming data storage system provides for segment groups that facilitate the distribution of event traffic among storage entities. When too much event traffic with the same routing key (or with a small number of routing keys) is being ingested by the system into one segment of a data stream, the system subdivides the segment into a segment group of sub-segments, which can be distributed among storage resources of the streaming data storage system. Writer components of the system append events received from upstream applications to the sub-segments along with a writer identifier and a sequence number for each event. Reader components of the system use writer identifiers and the sequence numbers to serve events from the segment group to upstream code in the proper order, on a per-writer basis.

20 Claims, 14 Drawing Sheets

SUB-ROUTING KEY SPLITS IN SCALING DISTRIBUTED STREAMING DATA STORAGE

BACKGROUND

Some contemporary data storage systems store data in a storage abstraction referred to as a data stream, or more simply, a stream. A stream is identified with a name, and can store continuous and potentially unbounded data; more particularly, a stream comprises a durable, elastic, append-only, sequence of stored events. New events are added to a tail (front) of a stream. As can be readily appreciated, one appropriate use case for a streaming data storage system is where devices/sensors may generate thousands of events (data points) per second to be stored for subsequent processing.

Streams can be divided into segments, with each event's routing key used (hashed) to determine to which segment each event is appended. The number of segments can change based on the ingestion rate of new events, which is referred to as scaling. When the ingestion rate to a segment is sufficiently high, a segment split is performed that creates two or more new successor segments from the predecessor segment. When the ingestion rate to a segment is sufficiently low, a segment merge combines two or more predecessor segments (that are adjacent with respect to routing key hashing) into a new single segment.

While scaling works well in many scenarios, there are times when a large number of events have the same routing key, meaning that one segment needs to handle those many events. Scaling does not alleviate such uneven ingestion traffic.

BRIEF DESCRIPTION OF THE DRAWINGS

The technology described herein is illustrated by way of example and not limited in the accompanying figures in which like reference numerals indicate similar elements and in which.

DETAILED DESCRIPTION

The technology described herein is generally directed towards subdividing a data stream's data segment into a "segment group" of sub-segments, along with writing to and reading from that segment group in a way preserves ordering and consistency. As will be understood, the segment group is internally managed by the streaming data storage system, and appears to external entities as a single unit.

It should be understood that any of the examples herein are non-limiting. Virtually any stream-based data storage system may benefit from the technology described herein. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

The subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
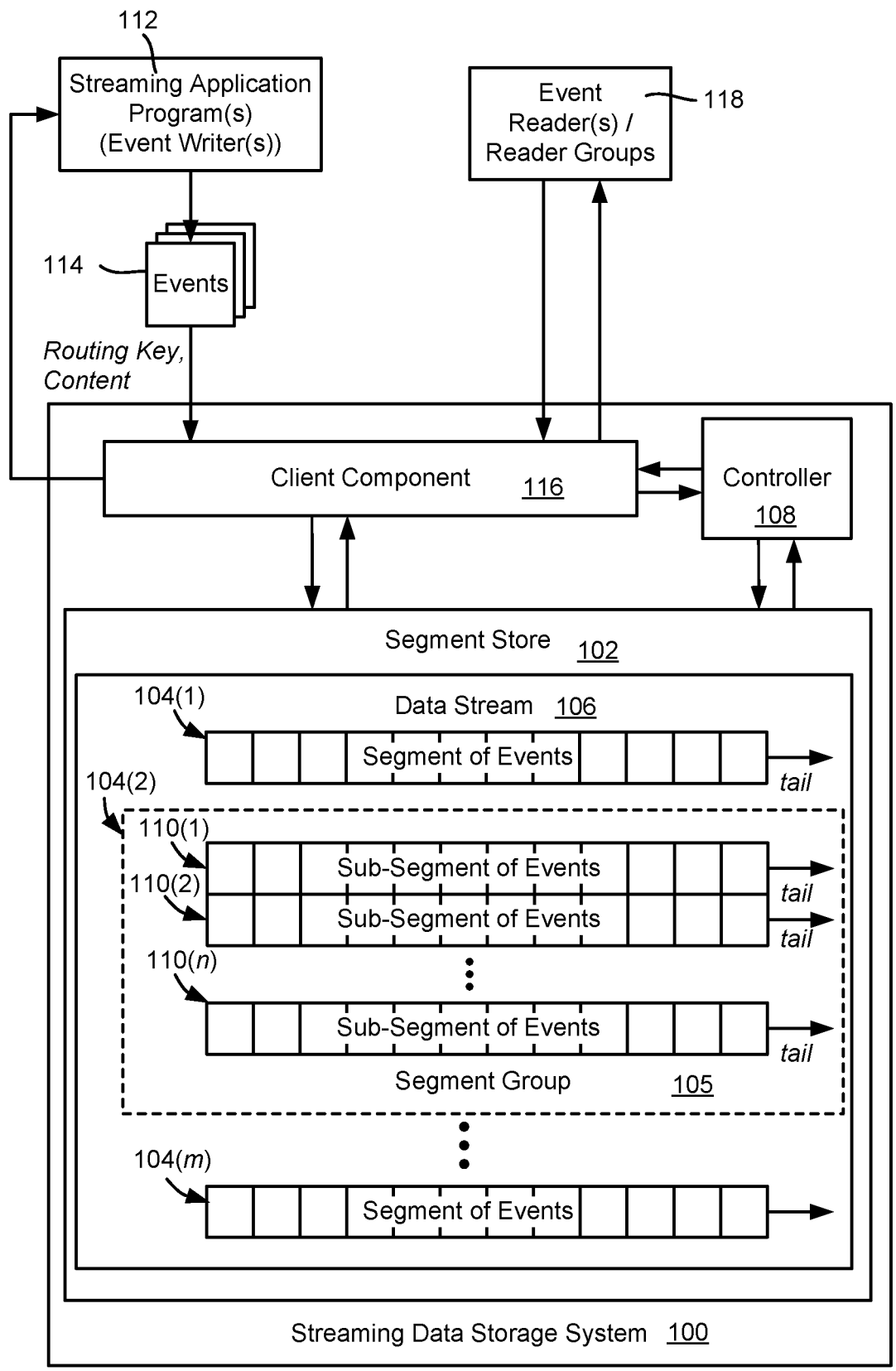
FIG. 1 is a block diagram representation of example components and data-related operations in a streaming data storage system in which a data segment can be subdivided into a segment group, in accordance with various aspects and implementations of the subject disclosure.

FIG. 1 shows a streaming data storage system 100 that includes a segment store 102 that maintains segments 104(1)-104(n) of streamed data events of (at least part of) a data stream 106; (note that in one implementation, the segment store is a stream-agnostic component, with a controller 108 responsible for uniting individual segments into the data stream). As described herein, one of the segments (the segment 104(2) in this example) is actually a segment group 105 comprising sub-segments 110(1)-110(n). Note that at least some of the segments 104(1)-104(n) and/or sub-segments 110(1)-110(n) can be in different segment stores distributed across different nodes of a node cluster.

In general, one or more streaming application programs 112, referred to as event writer(s) or writer applications, send events 114 into the streaming data storage system 100 via an application programming interface (API) of a client component 116. As is known, a conventional event comprises a routing key along with the event data contents to be stored; the contents can be alternatively referred to as the payload. The routing key for each event is hashed to determine to which segment that event is appended. As described herein, for events sent to a segment that is a segment group, the technology operates to append events to the segment group, per client-component writer, as if appended to a single segment.

Event reader(s) or reader group(s) 118 read the events for processing via a call to a read API of the client component 116. As described herein, the technology operates to return events from a segment group to a requesting reader as if written to a single segment, ordered on a per-writer basis.

Figure 2:
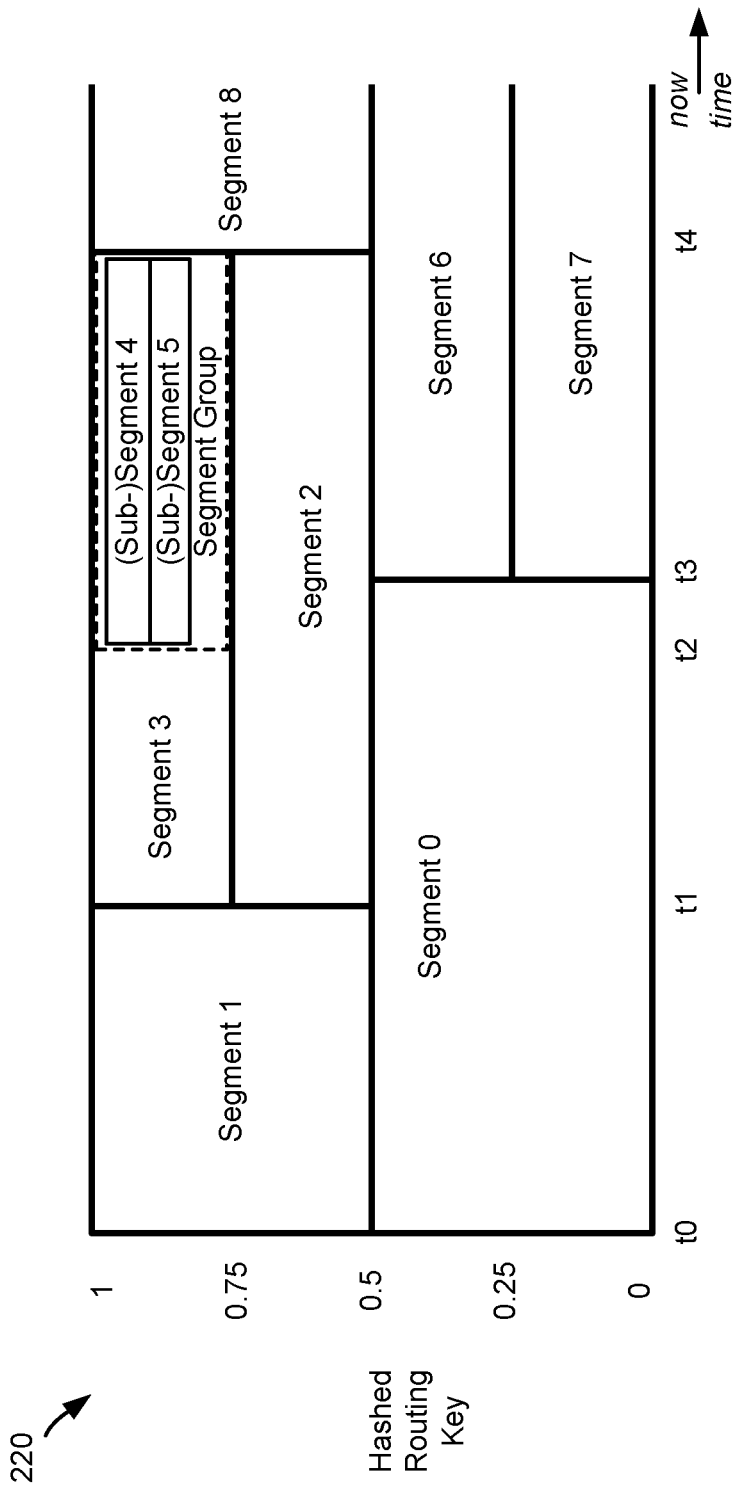
FIG. 2 is an example representation of a data segment that is scaled up and down over time, and in which one segment is subdivided into a segment group, in accordance with various aspects and implementations of the subject disclosure.

FIG. 2 shows the concept of segments, routing key space, segment scaling and segment subdivision. Initially at time t0 there are two segments segment 0 and segment 1, each of which owns a routing key space. That is, the routing key of each event is hashed to determine whether that event is appended to Segment 0 or Segment 1. At time t1, the Segment 1 is split into two successor segments, Segment 2 and Segment 3, with the hash computation corresponding to the routing key spaces adjusted to append each new event to Segment 0, Segment 2 or Segment 3. Note that the Segment 1 is sealed, in an atomic operation, in conjunction with the creation of the Segment 2 and the Segment 3. As can be seen, the successor segments Segment 2 and Segment 3 own disjoint ranges of the original routing key space of segment 1.

At time t2, Segment 3 is subdivided into sub-segments 4 and 5 of a segment group as described herein. At time t3, the Segment 0 is split into two segments, Segment 6 and Segment 7. At time t4, the Segment 3, which includes the segment group of sub-segments 4 and 5, is merged with Segment 2 into Segment 8. The Segments 2 and 3 are sealed in conjunction with the creation of the Segment 8; the hash computation corresponding to the routing key spaces appropriately adjusted at each segment split or merge.

Figure 3:
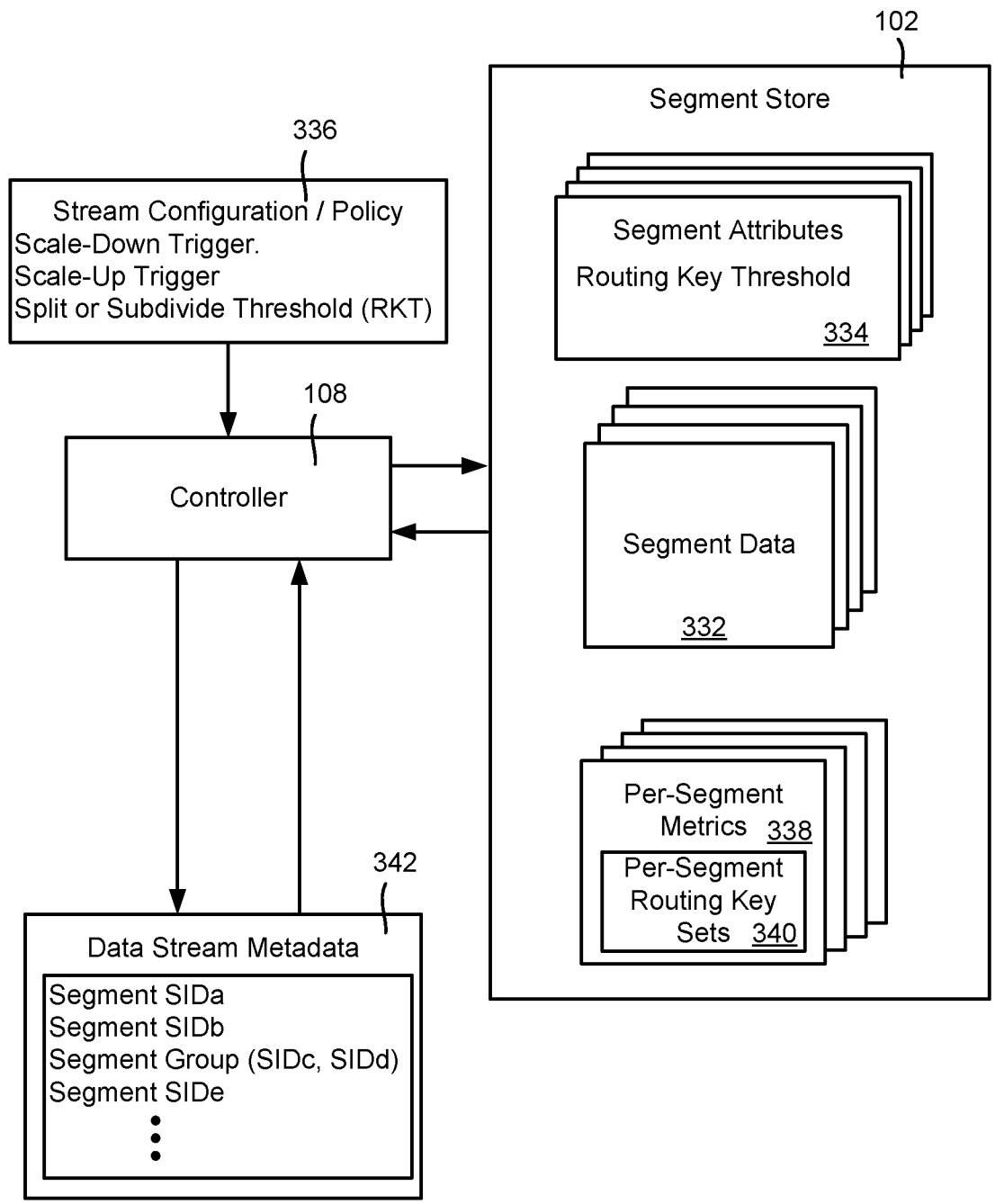
FIG. 3 is a representation of example components and related data structures in a streaming data storage system in which segment groups can be configured, in accordance with various aspects and implementations of the subject disclosure.

FIG. 3 shows one example implementation of a streaming data storage system that comprises the segment store 102 and the controller 108 of FIG. 1. The segment store 102 manages one or more segments of (at least part of) a data stream, and thus maintains segment data 332 and segment attributes 334.

In general, the controller 108 is a system coordinator. The controller 108 is in charge of scaling a data stream's segments, and as such, the controller 108 uses some scaling configuration (set by user/application as part of policy 336) and metrics 338 (e.g., event ingestion rate and/or byte rate) maintained and sent by the segment store 102 as a part of the event ingestion process. The controller 108 evaluates the event rate or byte rate for a segment (or other metrics), compares that with scaling thresholds defined in the policy 336 on a stream and thereby decides when to do scaling. For example, the policy can set to the controller will perform a scale up (segment split) operation on a segment if the segment's event rate is greater than 10,000 events per second or if the byte rate is greater than 100 megabytes per second. Merging segments is similarly based on the event rate or byte rate for a segment (or other metrics), which can be evaluated for falling below merging threshold values.

When a segment is split (due to scaling), such as into two successor segments, the routing key space associated with that segment is split in half, which means that the two successor segments are each responsible for approximately half of the routing keys assigned to the original segment (assuming a uniform distribution). For a finite set of routing keys used by the application, there is only so much scaling that can be done. If there are N routing keys used, the highest number of active segments that can receive ingestion traffic cannot exceed N.

If the events with a single routing key are responsible for an unevenly high amount of traffic to a data stream, there is no way, using the current scaling scheme, to spread the ingestion load across different segment stores (which are often on different physical nodes). The segment store responsible for the segment to which this routing key is assigned has to handle the entire load associated with that routing key, which can become a performance bottleneck, even though there may be spare computing/storage capacity on other nodes.

As described herein, a segment can be subdivided so that the traffic of events with the same routing key can be distributed. Subdividing a segment involves sealing a segment and replacing that segment with a segment group. A segment group is a set of two or more sub-segments that are created at the same time and sealed at the same time; with respect to scaling they are treated as a single unit, that is, in one implementation, sub-segments within a segment group cannot be individually scaled up or down. Furthermore, the sub-segments within a segment group share the same routing key space.

It should be noted that when converting user-supplied routing keys to a bounded, uniform space, it is possible that two distinct routing keys hash to the same routing key space value, that is, a hash collision can occur. As such the streaming data storage system does not guarantee that a segment/segment group deals exactly with a single routing key; instead multiple routing keys need to be handled due to the possibility of such hash collisions. The technology described herein is agnostic to the routing key itself, and instead uses writer identifiers to establish the ordering guarantees in a segment group, that is, events appended from each writer are guaranteed to be read back in the order appended per writer (rather than per routing key).

With respect to subdividing a segment, however, the controller 108 has no information about what events are in that segment or what the event's routing keys are. In general, subdividing a segment is performed when splitting a segment as part of the scaling process will not be effective with respect to distributing traffic; the controller 108 may attempt to split a segment receiving high traffic of events with the same routing key but not solve anything, as one successor segment would receive relatively little or no traffic, while another successor segment would end up receiving the same amount of traffic as before.

Described herein is keeping track of the number of distinct routing keys that are written per segment, and using that information to make a decision on subdividing a segment. A subdivision threshold is defined, as part of the stream scaling configuration/policy 336 that indicates the number of per-segment routing keys under which subdivision occurs, and above which splitting occurs. By way of example, if other condition(s) such as events/byte rate are met for scaling a segment Si and there is a routing key threshold RKT for the count of the segment's routing keys (Si.RoutingKeys), then:

If Count(Si.RoutingKeys)<RKT, then subdivide Si, or
If Count(Si.RoutingKeys)>=RKT, then split Si.

The controller 108 is responsible with maintaining the stream configuration and stream metadata 342, while the segment store 102 is responsible with managing other data relating to segments, including the segment data 332 written to/from its segments, and any metadata (segment attributes 334) associated with them.

The data stream metadata 334 needs to account for the existence of segment groups. In general, a stream is a bi-dimensional sequence of segments as shown in FIG. 2. Each segment (except the ones at the head of the stream) has one or more predecessor segments and each segment (except the active ones) has one or more successor segments. Each segment is assigned a contiguous routing key range by the controller 108 when the segment is created.

In one implementation, the data stream metadata 342 allows a segment a segment group to be a unit of a data stream. As such, a segment may have one or more segments or segment groups as predecessors or successors. In turn, a segment group may have one or more segments or segment groups as predecessors or successors.

A segment group is a unidimensional list of sub-segments that has at least two elements; (note that a single-element list is a segment, not a segment group). This is shown in the example data stream metadata 342 of FIG. 3 where the segments have single identifiers SIDa, SIDb and SIDe, while the segment group has two sub-segments with the identifiers SIDc and SIDd.

In order to make the appropriate decision with respect to splitting or subdividing a segment, the controller 108 needs to know whether the number of routing keys in a segment exceeds the routing key threshold RKT maintained in the stream policy data 336. Note that the controller 108 does not need to know the actual number of routing keys per segment, but rather whether or not they exceed the routing key threshold RKT, which makes an implementation of this feature more straightforward.

By way of example, consider a data stream configured with routing key threshold value RKT. When the controller 108 instructs the segment store 102 to create a segment for the data stream, the controller 108 passes the routing key threshold RKT to the segment store 102, which stores the routing key threshold value RKT in the segment's metadata. Note that if the routing key threshold is the same for the entire data stream, the controller only needs to pass this value RKT once to the segment store 102, which can maintain the routing key threshold in more general metadata rather than per-segment metadata.

The segment store 102 maintains statistics (per-segment metrics 338) about recent activity for each segment. Among the existing statistics, the segment store 102 keeps track of number of distinct events and total amount of written traffic for a recent time window. The time window can be configurable, e.g., the last minute, last hour, or the like. These statistics are maintained in-memory, but they may also be persisted on a durable media (e.g., to recover them from a crash).

For sub-dividing purposes, the segment store 102 extends the per-segment statistics/metrics 338 to include a data structure 340 that holds recently used routing keys, referred to as a routing key set (RKS). For every ingested event to a segment, the segment store adds (unions) the routing key to the segment's routing key set. If the count of routing keys for a segment exceeds the routing key threshold count (RKS)>=RKT, then the segment store 102 sets a flag on the segment indicating that the segment's routing keys exceed the routing key threshold. Note that once this is threshold is reached, the segment store can stop adding routing keys to the routing key set, e.g., to conserve memory, as there is no need to keep track of every routing key but rather only need to know if the count exceeds the routing key threshold or not.

The stream configuration (policy 336, FIG. 3), which is set on a stream on creation and can be optionally updated during the lifetime of a stream, contains, among other data, a scaling policy that may define triggers for scaling up and scaling down. For example, the scaling policy may instruct the controller to scale up when the event rate is greater than 10,000 events per second or the byte rate is greater than 100 megabytes per second, and to scale down when the event rate is less than 10 events per second or the byte Rate is less than 1 megabyte per second. Further, as described herein, the threshold for splitting versus subdividing a segment can be defined as a count of distinct routing keys per segment/segment group. For example, if other triggers trigger a scale up, if the count of distinct routing keys is less than a routing key threshold value, e.g., four (Count(Distinct(RK))<4), then subdivide the segment, otherwise split the segment.

Figure 4:
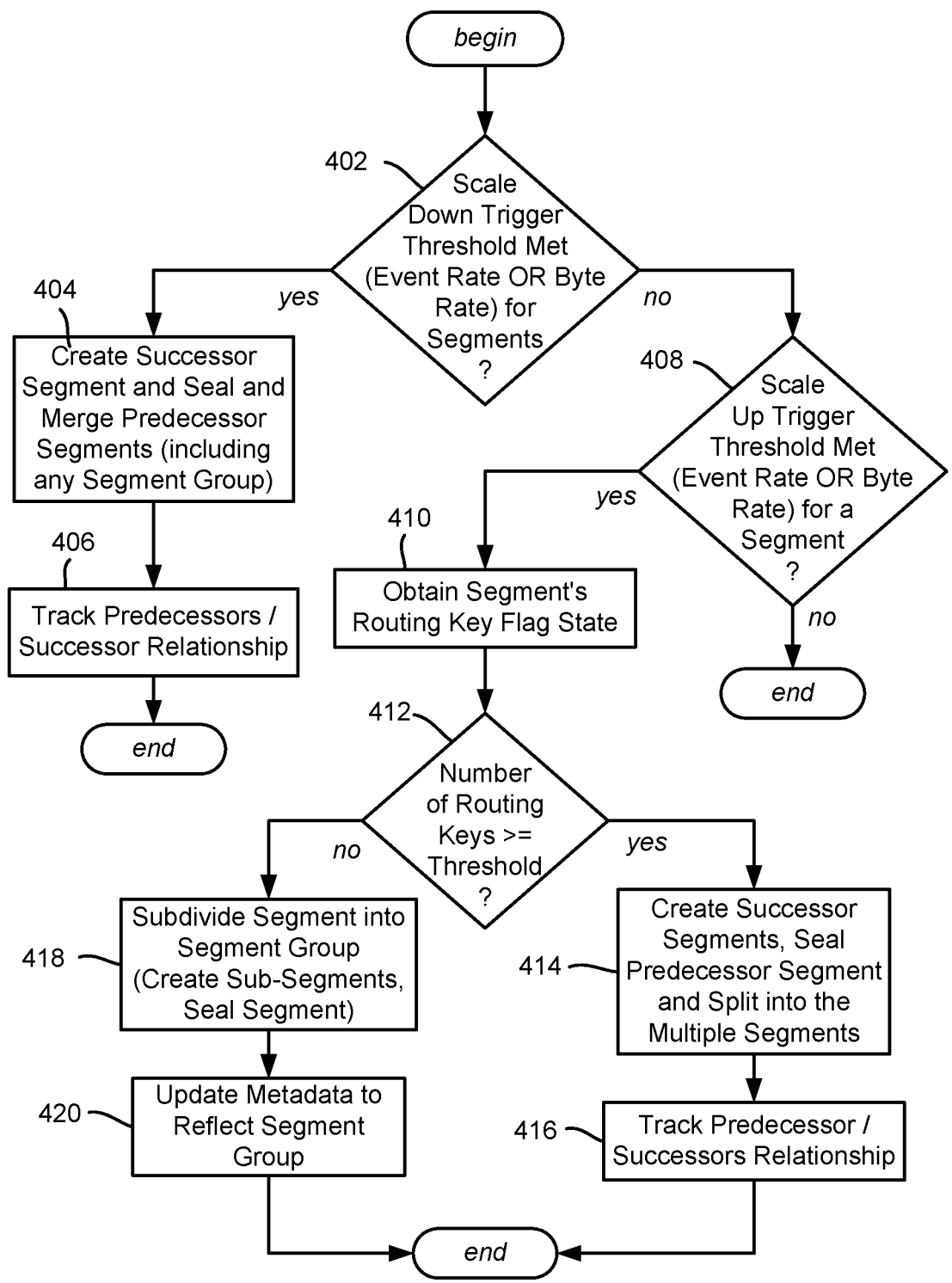
FIG. 4 is a flow diagram representing example operations of evaluating a segment for scaling operations or subdividing into a segment group, in accordance with various aspects and implementations of the subject disclosure.

FIG. 4 is a flow diagram showing example operations with respect to scaling and subdividing, beginning at operation 402 where scaling/subdividing is evaluated based on segment statistics versus the thresholds. If at operation 402 a scale down trigger is met, the controller at operation 404 creates a successor segment and seals and merges the predecessor segments, including any segment group. Operation 406 tracks the predecessors and successor relationship.

If the scale down trigger is not met, operation 408 evaluates the scale up triggers. If one is met, operation 410 obtains the segment's routing key flag state that indicates whether or not the segment's routing key count has exceeded the routing key threshold. If at operation 412 the flag is set (the routing key count exceeds the threshold), then a split is performed via operations 414 (create successor segments, seal predecessor segment and split into the multiple segments) and 416 (track the predecessor and successors relationship).

If instead a scale up trigger is met and the number of routing keys is below the threshold, then a subdividing operation is performed. To this end, operation 418 subdivides the segment into segment group by creating the sub-segments and sealing the prior segment. Operation 420 updates the metadata so that the existence of the segment group is known the controller, which will provide the information to other components of the streaming data storage system, including client component writers.

It should be noted that with respect to a scale down (merge) operation, it is feasible to have a segment group be reunited into a single segment based on a reuniting threshold value. In one implementation, however, if the controller has determined that a segment group has such low traffic that a merge can occur, then there is no need for such a threshold, as the controller proceeds with a scale down, transforming a segment group and an adjacent segment/segment group (or more than one) into a single segment.

Turning to writing and reading, a segment group appears as a single unit to both writers and readers. As such, when a client component writer 550 (FIG. 5) of the client component 116 requests a segment from the controller 108 based on some event's routing key, the client component writer 550 may get a single segment or may get a segment group. If a single segment, nothing changes with respect to how writing or reading works. For segment groups, the client component writer 550 needs to alternate between the segments within such segment groups when appending events. The client component readers 552 need to read said events in such a way that ordering guarantees are not broken.

When the client component writer 440 needs to write to a segment group SG, the client component writer 440 can employ a round-robin-style pattern, (or some other pattern that operates to divide events with the same routing key approximately evenly). For example, if the segment group SG={S4, S5}, the client component writer 440 may write the first event to S4, the next one to S5, the next again on S4, then S5, and so on. Alternatively, the client component writer 440 may choose to (or be configured to) write a sequence of events to one segment before switching over to another segment (that is, batch events when writing to alternate segments).

A segment group may be both the target of a plurality of routing keys (due to the subdivision threshold), and have multiple writers appending events to its sub-segments. Within a single segment per-writer order is not a concern due to the ordering guarantees within the segment. However, with alternating (e.g., round-robin) appending between sub-segments, ordering is an issue.

To address this issue, each writer writing to a segment group needs to encode its writer identifier (ID) and a sequence number in each event. The writer ID is a unique identifier associated with each writer. Note that in one implementation of a streaming data storage system, a writer already generates such an ID (and guarantees its uniqueness) for de-duplicating data in case of crashes.

The event sequence number is a monotonically increasing number that is assigned by each writer to each event that is sent for appending to the segment group. The event sequence number begins at 0 (for the writer's first event sent to a segment group) and is incremented with each new event that is sent to that segment group. Note that the streaming data storage system does not necessarily need to encode the routing key with the events (one implementation does not do this for regular segments either); because the ordering guarantee is per routing key-writer pair, the system can guarantee per-writer ordering within a segment/segment group as described herein, which implicitly guarantees per routing key-writer order.

Figure 6:
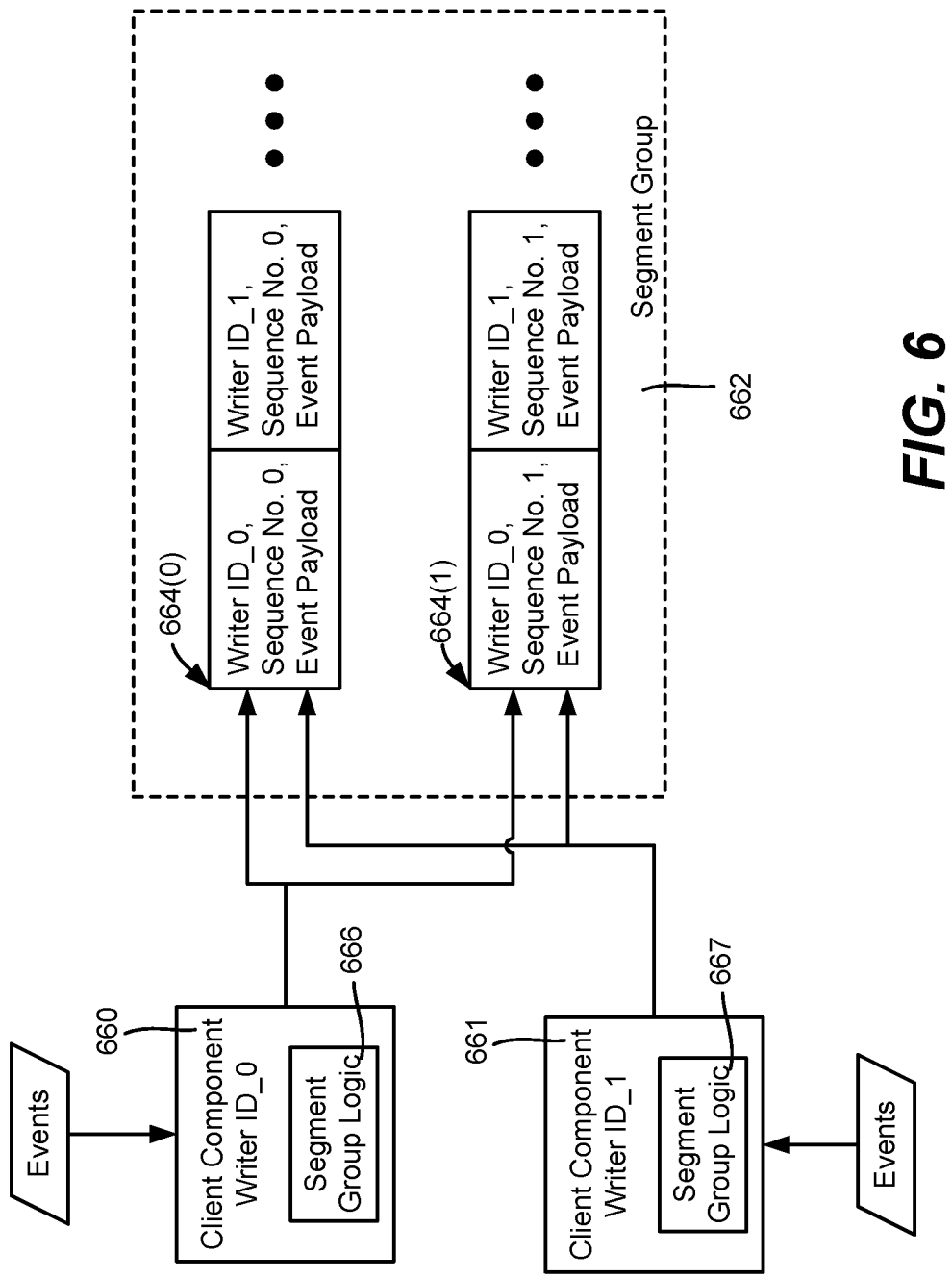
FIGS. 6 and 7 are example block diagram representations of how events can be appended to a segment group in different ways, in accordance with various aspects and implementations of the subject disclosure.

An example is shown in FIG. 6, where two client component writers 660 (ID_0) and 661 (ID_1) write to a segment group 662, comprising two sub-segments 664(0) and 664(1). Segment group logic 666 and 667 of the writers 660 and 661, respectively, is set to alternate the event appending between the two sub-segments 664(0) and 664(1) on a per-event basis (rather than a per-batch basis) in this example.

As can be seen in the example of FIG. 6, the writers 660 and 662 write events at different, unpredictable times. However, because the events each include a writer ID, and a sequence number is assigned to each event, as described herein the client reader component 552 (FIG. 5) can read the events back for any writer in the order appended for that writer ID.

Readers reading from a segment group will need to process the extra information encoded by writers and use that to figure out how to reconstruct the correct order of events across the sub-segments within a segment group. The goal is to serve events to upstream applications in the same order they were written by their writers. In a single segment, that entails simply reading the segment from head to tail, but with multiple segments, the streaming data storage system has to account for out of order events (due to network delays, for example).

More particularly, sequence numbers are used because writers can use different network connections, (e.g., consider four connections, two per writer), and the different connections can cause a sequencing problem. A connection drop can cause enough of a delay to have one event arrive significantly later than (and thus after) another event that uses a different connection. This ordering inversion is thus handled by encoding the writer ID and the writer event sequence number with each event in a segment group. A client component reader uses this information to properly reorder events when consumed, as described herein.

Figure 7:
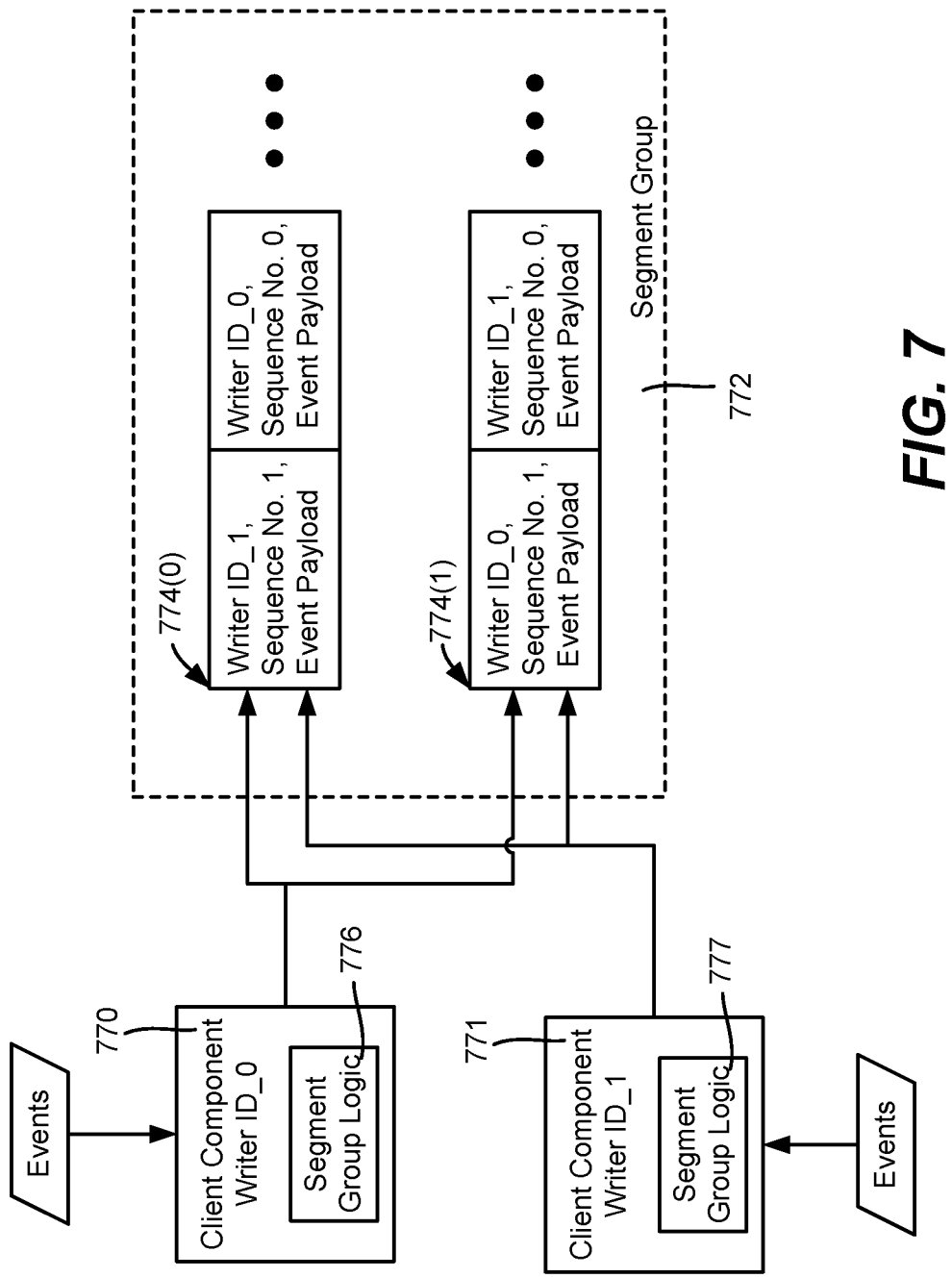

By way of examples, consider the example appending possibility shown in FIG. 6 in contrast to that shown in FIG. 7. In both examples, a client component writer with Writer ID_0 sends events E0-0 and E0-1 for appending to a segment group, and another client component Writer ID_1 sends events E1-0 and E1-1 for appending to the same segment group. Even though sent in the correct order by their respective writers, events may be appended in different possible orders to segment group segments.

In FIG. 6, it is seen that sub-segment 662(0) contains, in the depicted order, {Writer ID_0, E0-0}, {Writer ID_1, E1-0}. The sub-segment 662(1) contains, in the depicted order, {Writer ID_0, E0-1}, {Writer ID_1, E1-1}.

In FIG. 7, it is seen that sub-segment 772(0) contains, in the depicted order, {Writer ID_1, E1-1}, {Writer ID_0, E0-0}. The sub-segment 772(1) contains, in the depicted order, {Writer ID_0, E0-1}, {Writer ID_1, E1-0}.

In both cases above, the writer applications with Writer ID_0 and Writer ID_1 respectively sent their events in rapid succession, but asynchronously, (that is, not waiting for previous event(s) to be acknowledged (ACK-ed) before sending a next event). In the example of FIG. 6, the events from the writer 660 (Writer ID_0) arrived first (both on segment 662(0) and segment 662(1)). However, in the example of FIG. 7, the second events from each writer got written first to each segment 772(0) and segment 772(1), while the first events got written last. The reader thus uses the sequence number to ensure the correct ordering, per writer ID.

Figure 8:
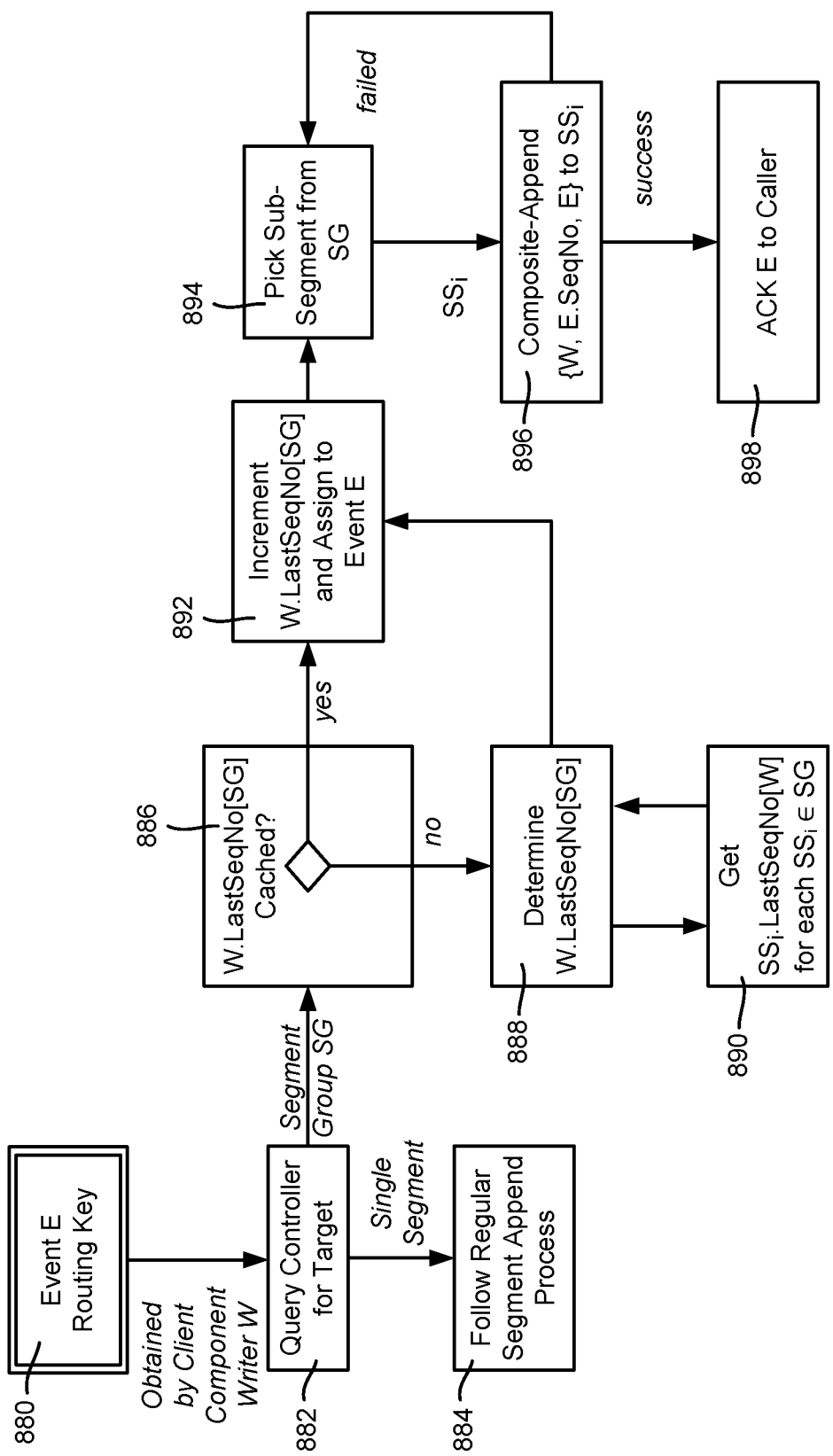
FIG. 8 is a block/dataflow diagram showing example operations related to writing event data to a segment group, in accordance with various aspects and implementations of the subject disclosure.

FIG. 8 shows the write process for an event E, with routing key RK (block 880); the writer (a client writer component 550, FIG. 5, of the client component 116) is identified with a writer ID of W. Block 882 queries the controller for the target segment or segment group; if a segment, block 884 handles as with conventional segments, that is, the operations do not change for regular segments.

Figure 5:
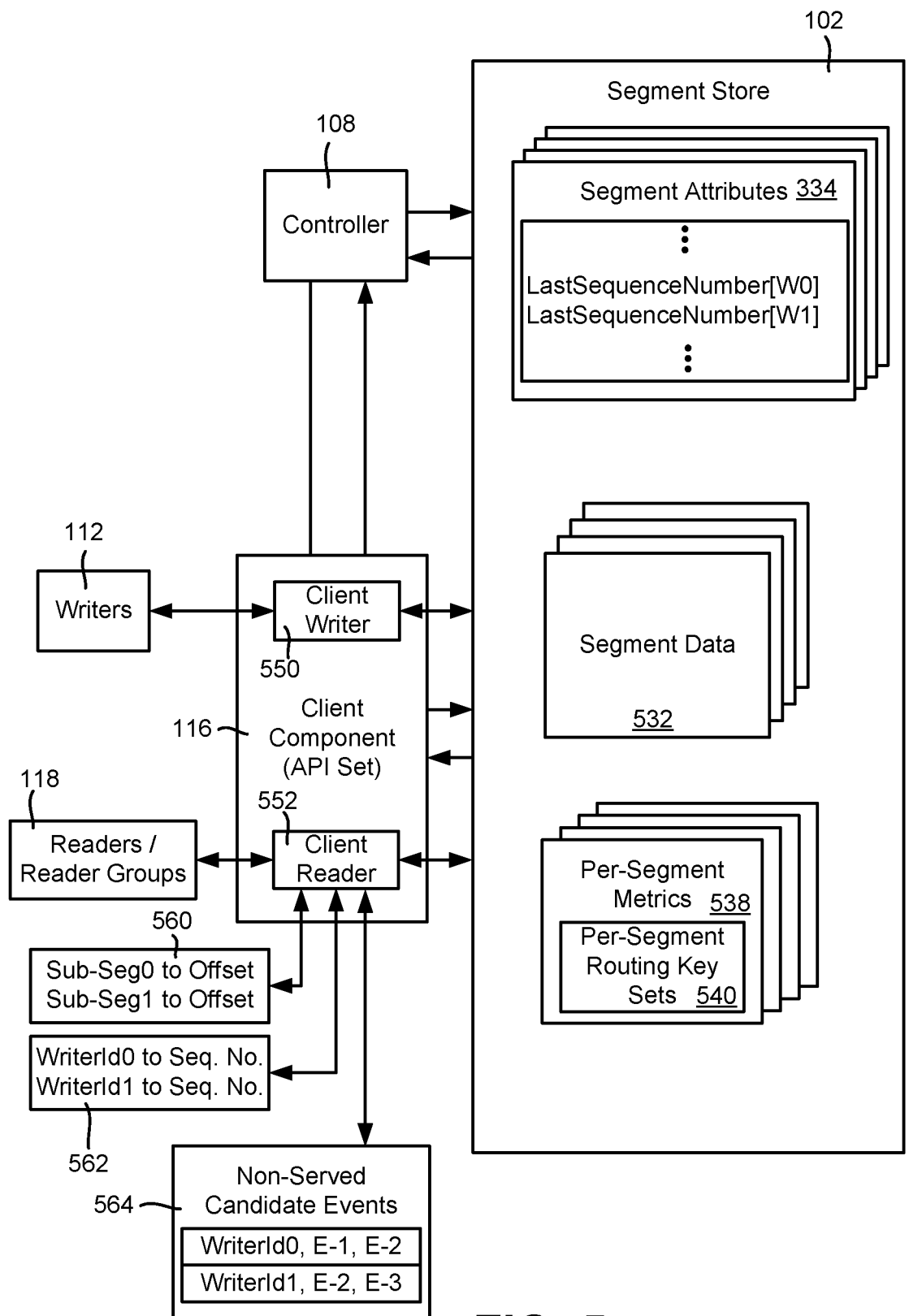
FIG. 5 is a representation of example components and related data structures in a streaming data storage system in which segment groups can be written to and read from, in accordance with various aspects and implementations of the subject disclosure.

If instead the controller returns a segment group, the writer W needs to follow a different protocol. To support this, the writer W stores specific metadata on the sub-segments within a segment group. As shown in FIG. 5, in the segment attributes 334, each writer (W0 and W1 in FIG. 5) can set an attribute, e.g., named LastSequenceNumber

[Writer ID], (abbreviated to LastSeqNo[W] in FIG. 8), on each segment part of a segment group.

Then, when a writer with an identifier of W needs to write to a segment group SG, (assuming the sequence number is not yet cached (block 886)) the writer W needs to determine (block 888) if it has previously written to this segment group SG (i.e. reconnects). Via block 890, for each sub-segment SSi in the segment group SG, the writer queries the SSi.LastSequenceNumber[W] (from the segment store 102). If there is no value, the writer assumes −1.

The writer calculates the maximum of the values obtained by querying the segment store at block 890, which is the sequence number of the last successfully appended event to the segment group SG. If the value is −1, then the writer W has never written to the segment group SG. This value W.SequenceNumber[SG] can be recorded (block 886).

When the writer W needs to append the event E to the segment group SG, (note that the controller 108 has already informed the writer W that based on the event E's routing key RK that E needs to go to the segment group SG), block 892 increments the last written sequence number, that is, sets W.SequenceNumber[SG]:=W.SequenceNumber[SG]+1, and associates the writer's updated event sequence number with the segment group SG, that is, set E.SequenceNumber:=W.SequenceNumber[SG].

Block 894 selects a sub-segment SSi from the segment group SG. This can be an arbitrary pick, or the writer may round-robin through the segments in the segment group SG. If round-robin, the writer W may need to remember the last segment written to within the segment group SG. As an optimization, the writer W may choose to write a sequence of events to a segment before moving on to another one (batch events as set forth above). As part of the selection, the writer W locates the segment store that owns the sub-segment SSi; (this may be cached within the writer W or the writer W may query the controller for this information).

Via block 896, the writer W makes a composite append to the sub-segment SSi. Note that a composite append atomically appends specified data to a segment (or sub-segment in this example) along with updating that segment's (attribute) metadata with specified related information. The appended data comprises the information of {W, E.SequenceNumber, E}. This encodes the source writer's ID and the event E's sequence number along with the event. The last sequence number is updated part of the composite append, that is, update SSi.LastSequenceNumber[W]:=E.SequenceNumber. Note that if the composite append fails, a different sub-segment can be selected.

When the segment store acknowledges the append of the event E, this ACK can be propagated upstream to the source application (the caller), notifying the caller that the event E has been durably stored. There is no need to wait for this ACK to be returned before the writer can start the process of appending another event. As soon as the composite append is initiated, the writer W may accept another event from an upstream caller and repeat the process as necessary. There are various ways to implement the writing process. One example implementation may include using a queue of requests; as new events come in, they get added to a writer queue, and the writer will pick from this queue to append an event.

It is possible that the writer may get disconnected from a segment store or some other kind of connection failure may happen. In this case, the writer needs to reconcile its state with a segment group prior to attempting to send new events to its sub-segments (it may not be fully up-to-date with what has been committed server-side as ACKs may have been dropped along the way). If this happens, or if the writer or its host application crashes, the writer needs to re-execute the querying operation described above (blocks 888 and 890) to determine the last written sequence number among the sub-segments of the segment group.

If after this reconciliation step the writer determines that it needs to resend one or more events (since they were not ACK-ed), the writer is free to resend them to any sub-segment within the segment group SG. However, as the event already has an associated sequence number, the operations of block 892, of incrementing the sequence number and assigning to event E, need to be skipped; (assigning a new sequence number may cause the event to become out-of-order because other subsequent events may have already been written).

Further, the composite append operation (block 896) needs to be modified to Si.LastSequenceNumber[W]:=Max (Si.LastSequenceNumber[W], E.SequenceNumber). In other words, if subsequent events have been written to this segment, the system does not rollback the server-side LastSequenceNumber of this writer.

FIG. 8 thus shows an example flow of write operations for a single event; note that information such as the last sequence number can be cached for use (block 886) with a next event, instead of having to query for the last sequence number each new event. As can be seen, the job of the writer is to encode enough information in the sub-segments within a segment group in order for its events to be read in order. It is the reader's task to process that information and provide the events to the upstream application without violating any of the per-writer ordering guarantees.

A consistency guarantee states that, once a portion of a data stream is read, any subsequent reads of the same portion the streaming data storage system will always return the same data to the calling code as was done the first time. This guarantee is not affected by employing segment groups, because the individual sub-segments within a segment group are still append-only and immutable, and because reading from them uses a deterministic method (described below with reference to FIG. 9), this guarantee is maintained.

The ordering guarantee is also not violated because as described below, the reader uses the information encoded by the writers in each sub-segment within a segment group to properly recreate the exact sequence of events per writer. Note that this is what is needed for the ordering guarantee; events produced by different writers, even if to the same routing key, are not subject to this guarantee.

Reading from a data stream is often done using a reader group. Within a reader group, individual readers (as many as the application may specify) coordinate amongst themselves to read from individual segments within the data stream, making sure that a Segment B that is a successor to a Segment A is processed after Segment A. The readers of a reader group distribute segments amongst themselves without overlap (no two readers may read from the same segment at the same time) and without skipping segments.

Figure 9:
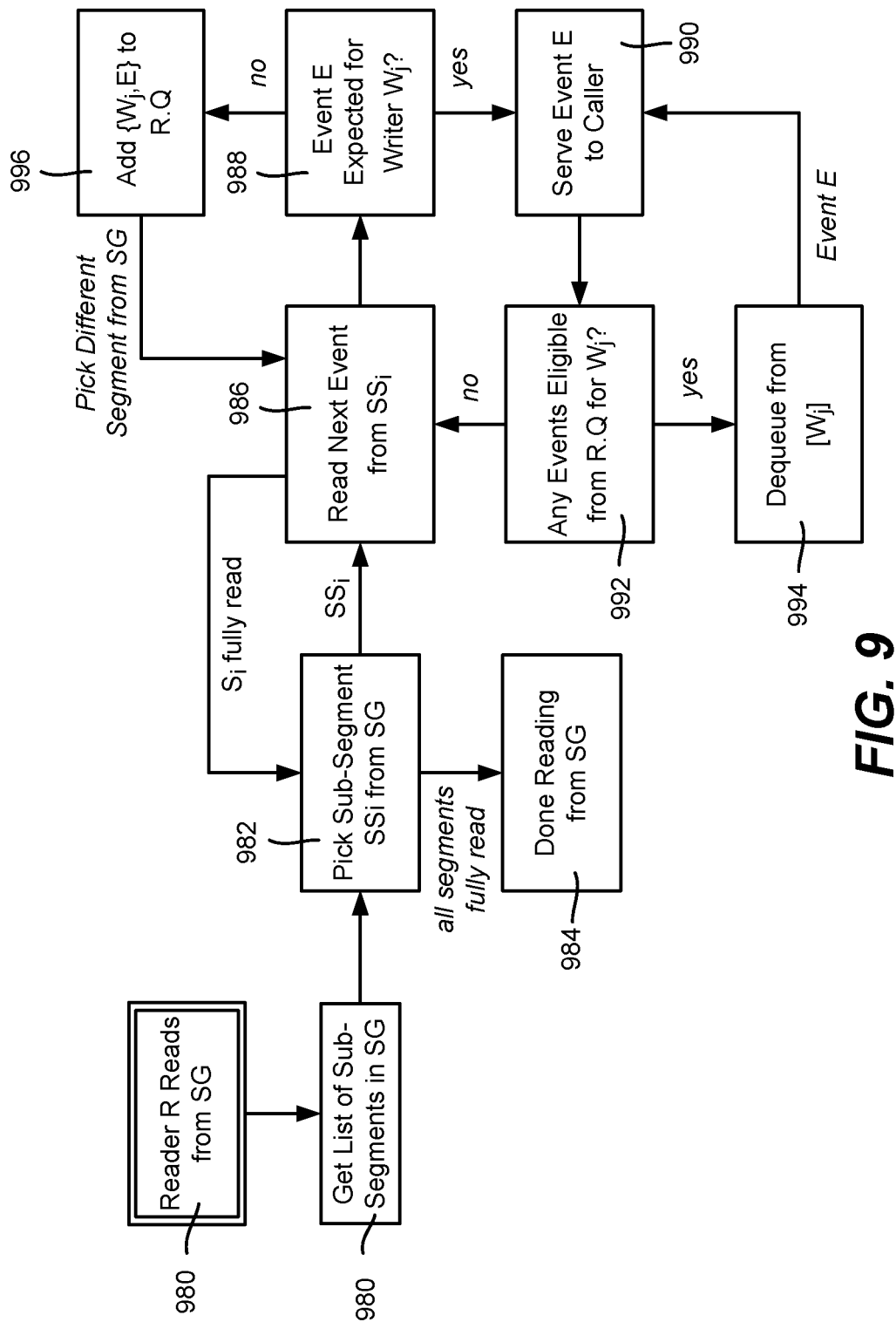
FIG. 9 is a block/dataflow diagram showing example operations related to reading event data from a segment group, in accordance with various aspects and implementations of the subject disclosure.

One implementation of a read process for a segment group is shown in FIG. 9, where a client component reader R (e.g., block 552 of FIG. 5) is reading from a segment group SG (block 980). The reader R obtains a list of the sub-segments in the segment group SG (block 980), and maintains a sub-segment-to-offset mapping 560 (FIG. 5) for each sub-segment SSi in the segment group SG. Each mapping indicates the offset of the first byte that has not yet been read from that sub-segment, and as such, is initialized to zero (0). Note that the term SSi.Offset refers to a value in this map for sub-segment SSi.

The reader R also maintains a WriterId-to-SequenceNumber 562 mapping for the segment group SG. This mapping indicates the sequence number of the next event that is expected to be read from SG for a particular writer. This mapping 562 need not be initialized (i.e., starts out as empty), as the reader does not need to know the full set of writers as reading begins. The term Wi.SeqNo refers to a value in this map for each writer Wi. If Wi is not present in this mapping, the reader assumes that (Wi.SeqNo==0) is associated with it; (the initial sequence number, which is consistent with the write process above).

The reader R also maintains an in-memory data structure Q 564 (FIG. 5) containing events that have been read from the segment group SG but are not ready to be served (because they are out-of-order). The data structure Q 564 is made up of several sub-queues, each indexed by writer ID. Within each such sub-queue, events can be ordered by their sequence number.

By way of example, consider a data structure Q=(W1: {5, E1-5}, {6, E1-6}, W2: {2, E2-2}} that contains two sub-queues. Writer W1's sub-queue contains event E1-5 with SeqNo 5 and E1-6 with SeqNo 6. For writer W2, there is Event E2-2 with SeqNo 2.

At block 982 of FIG. 9, the reader R picks a sub-segment SSi from the segment group SG that has not yet been fully read (Si.Offset<Si.Length), and at block 986 reads the tuple T={Wj, E.SeqNo, E} from SSi that is located at SSi.Offset. Note that once fully read, the reader is done reading from this segment group SG (block 984). As part of the reading, the reader updates the offset value for this sub-segment, SSi.Offset:=SSi.Offset+Length(T).

As represented by block 988, the reader compares the event's sequence number E.SeqNo with the sequence number based on (incremented) what was previously read and served for this writer Wj.SeqNo. If a match, then the reader serves the event E to upstream code via block 990; (note that the upstream code does not care about writer IDs or sequence numbers, which are for system-internal use only). In conjunction with serving the event, the reader increment the writer's sequence number, update: Wj.SeqNo:=Wj.SeqNo+1, as the reader is now expecting to read the next event for this writer.

Further, at block 992, the reader R consults the queue for this writer Q[Wj]. As long as the first element Eq in the queue for this writer Q[Wj] has Eq.SeqNo==Wj.SeqNo., the element/event is dequeued from Q (block 994), and served to the upstream caller at block 990; (the sequence number for this writer is appropriately updated). The dequeued element/event is a read that had been previously buffered because it was read out of the sequence order. The process repeats until no queued events, if any, are eligible for returning based on their sequence numbers.

The reader R may choose to continue reading from the sub-segment SSi (as in the example of FIG. 9 at block 986) or go back to block 982 to pick another sub-segment to read from. Choosing to continue may yield performance benefits as the reader can "bulk-read" multiple events from the current sub-segment SSi as opposed from one at a time.

Returning to block 988, if an event's sequence number is not the next event to serve for this writer, that is, there is not a match between E.SeqNo with the sequence number expected to be read for this writer, Wj.SeqNo, via block 996 the reader adds the tuple T to the sub-queue in the data structured Q for this writer, (using Wj, E.SeqNo and E as parameters). This is because the reader was not expecting Event E with this sequence number yet. For now, the event cannot be served to the upstream code because there may be other events that have to be served before it.

Note that although not required, when this occurs the reader R can stop reading from sub-segment SSi and go back to block 982 to choose another sub-segment to read from. One reason for yielding is because if the reader continues reading from the same sub-segment, the queue Q for this writer cannot be drained; on the contrary, Q is likely to continue to grow which can result in excessive memory consumption.

By way of an example, consider two client component writers W1 and W2 that want to write to a segment group made of sub-segments S1 and S2. The writer W1 wants to write events E1-0, E1-1 and E1-2 (in this order), and the writer W2 wants to writer E2-0 and E2-1 (in this order). The writers W1 and W2 initiate the writing process on or around the same time. When done, the sub-segments contain the following ({Writer-Id, WriterEventSeqNo, Event}):

S1: {W2, 1, E2-1}, {W1, 0, E1-0}, {W1, 2, E1-2}
S2: {W1, 1, E1-1}, {W2, 0, E2-0}

A client component reader R begins reading from the segment group made of {S1, S2}. The reader R reads {W2, 1, E2-1} from S1 and adds it to the sub-queue for this writer, R.Q[W2]. The reader expected Seq. No 0 for W2, but it found Seq. No. 1, so the reader cannot serve this event yet.

The reader R reads {W1, 1, E1-1} from sub-segment S2 and adds it to R.Q[W1], because the reader expected Seq No. 0 for W1, but it found Seq. No. 1. Thus, the reader also cannot serve this event yet.

Next, the reader R reads {W1, 0, E1-0} from the sub-segment S1 and because this was the expected event (the event and expected sequence numbers matched), the reader serves the event to the upstream caller and updates the expected next sequence number. Further, based on the updated sequence number, the reader R dequeues {W1, 1, E1-1} from the sub-queue for this writer R.Q[W1], serves the event to the upstream caller and updates the sequence number corresponding to this writer W1. Next, the reader R reads {W1, 2, E1-2} from the sub-segment S1 and serves the event to the upstream caller, because this event's sequence number was expected.

As the sub-segment S1 is fully read, the reader R next reads {W2, 0, E2-0} from the sub-segment S2 and serves the event portion to the upstream caller. The reader R dequeues {W2, 1, E2-1} from R.Q[W2] and serves the event to the upstream caller. The reader R is now done reading from the segment group {S1, S2}.

Figure 10:
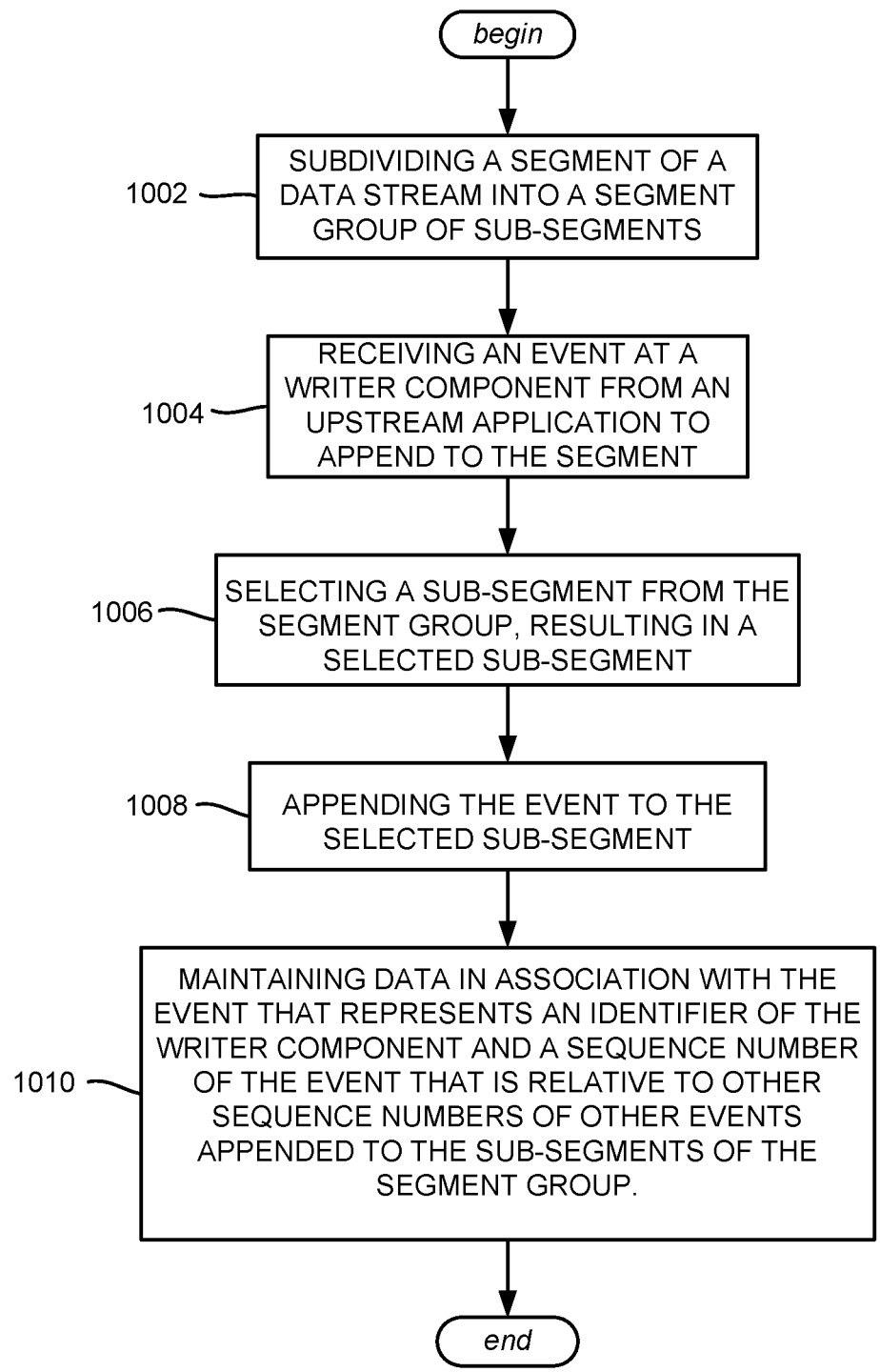
FIG. 10 is a flow diagram showing example operations related to subdividing a segment into a segment group and appending an event thereto, in accordance with various aspects and implementations of the subject disclosure.

One or more implementations can be embodied in a system, such as represented in FIG. 10 and for example can comprise a memory that stores computer executable components and/or operations, and a processor that executes computer executable components and/or operations stored in the memory. Example operations can comprise operation 1002, which represents subdividing a segment of a data stream into a segment group of sub-segments. Operation 1004 represents receiving an event at a writer component from an upstream application to append to the segment. Operation 1006 represents selecting a sub-segment from the segment group, resulting in a selected sub-segment. Operation 1008 represents appending the event to the selected sub-segment. Operation 1010 represents maintaining data in association with the event that represents a writer identifier of the writer component and a sequence number of the event that is relative to other sequence numbers of other events appended to the sub-segments of the segment group.

Selecting the sub-segment from the segment group can comprise alternating between sub-segments of the segment group per event.

Selecting the sub-segment from the segment group can comprise alternating between sub-segments of the segment group for batches of events.

Further operations can comprise atomically sealing the sub-segments of the segment group.

Further operations can comprise maintaining a last read sequence number associated with the segment group and the identifier of the writer application, receiving a read request to read event data from the segment, in response to the read request, selecting a reading sub-segment from the segment group, reading a next read event from the reading sub-segment, and obtaining an associated sequence number and writer identifier of the next read event, determining, based on the last read sequence number, whether the associated sequence number of the next read event is a subsequent sequence number relative to the last read sequence number associated with the writer identifier, and in response to the associated sequence number of the next read event being the subsequent sequence number associated with the writer identifier, returning the event data of the next read event to the caller, and updating the last read sequence number associated with the writer identifier to the subsequent sequence number.

The reading sub-segment can be a first reading sub-segment, the next read event can be a first next read event, the sequence number of the first next read event can be a first sequence number associated with the writer identifier, the associated sequence number can be an associated first sequence number, and further operations can comprise in response to the associated first sequence number of the first next read event not being the first next sequence number associated with the writer identifier, maintaining the event data of the first next read event in a data structure in association with the first sequence number and the writer identifier, selecting a second reading sub-segment from the segment group, reading a second next read event from the second reading sub-segment, and obtaining an associated second sequence number of the second next read event, determining, based on the last read sequence number, whether the associated second sequence number of the second next read event is a subsequent sequence number relative to the last read sequence number associated with the writer identifier, and in response to the associated second sequence number of the second next read event being the subsequent sequence number associated with the writer identifier, returning the event data of the second next read event to the caller, and updating the last read sequence number associated with the writer identifier to an updated last read sequence number sequence number based on the second sequence number.

The associated first sequence number of the first next read event may not be the subsequent sequence number associated with the writer identifier, and further operations can comprise accessing the data structure to determine whether the associated first sequence number associated with the writer identifier of the first next read event is a subsequent sequence number associated with the writer identifier relative to the updated last read sequence number associated with the writer identifier, and in response to the associated first sequence number of the first next read event being the subsequent sequence number associated with the writer identifier relative to the updated last read sequence number associated with the writer identifier, returning event data of the first next read event in further response to the read request, removing the first next read event from the data structure, and updating the last read sequence number associated with the writer identifier to a next updated last read sequence number sequence number associated with the writer identifier based on the first sequence number.

The associated first sequence number associated with the writer identifier of the first next read event may not be the subsequent sequence number associated with the writer identifier, and further operations can comprise receiving a subsequent read request, accessing the data structure to determine whether the associated first sequence number associated with the writer identifier of the first next read event is a subsequent sequence number associated with the writer identifier relative to the updated sequence number associated with the writer identifier, and in response to the associated first sequence number of the first next read event being the subsequent sequence number associated with the writer identifier relative to the updated sequence number, returning event data of the first next read event in a subsequent response to the subsequent read request, removing the first next read event from the data structure, and updating the last read sequence number associated with the writer identifier to a next updated last read sequence number associated with the writer identifier based on the first sequence number associated with the writer identifier.

Subdividing the segment into the segment group can comprise subdividing the segment in response to determining that an event quantity ingestion rate is greater than an event quantity ingestion rate threshold value or that an event size ingestion rate is greater than an event size ingestion rate threshold value, and that a number of distinct routing keys that map to the segment is less than a defined routing keys threshold number. The defined routing keys threshold number can be obtained from policy data associated with the data segment.

Figure 11:
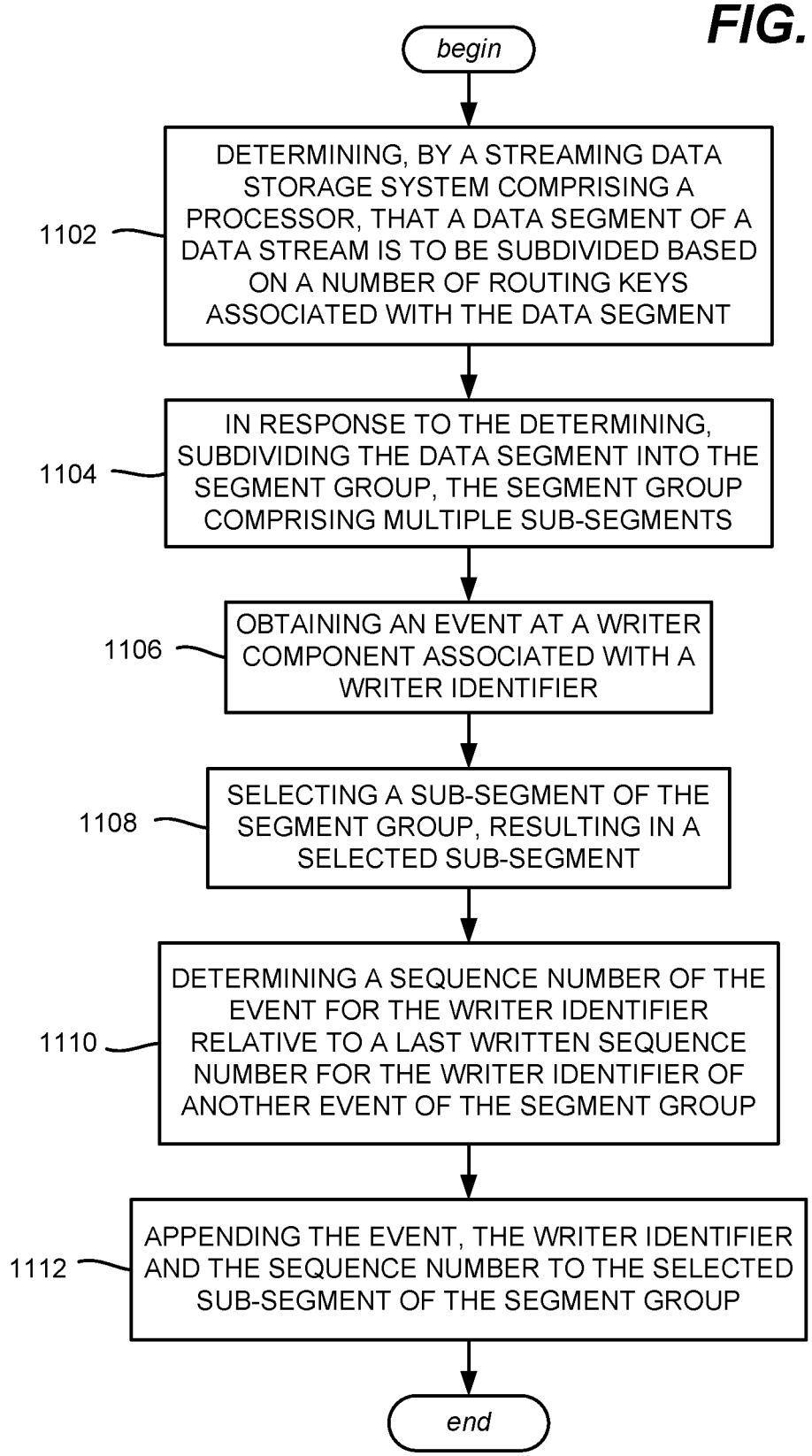
FIG. 11 is a flow diagram showing example operations related to determining that a segment is to be divided into a segment group, and appending an event to a sub-segment of the segment group, in accordance with various aspects and implementations of the subject disclosure.

One or more example implementations, such as corresponding to example operations of a method, are represented in FIG. 11. Operation 1102 represents determining, by a streaming data storage system comprising a processor, that a data segment of a data stream is to be subdivided based on a number of routing keys associated with the data segment. Operation 1104 represents, in response to the determining, subdividing the data segment into the segment group, the segment group comprising multiple sub-segments. Operation 1106 represents obtaining an event at a writer component associated with a writer identifier. Operation 1108 represents selecting a sub-segment of the segment group, resulting in a selected sub-segment. Operation 1110 represents determining a sequence number of the event for the writer identifier relative to a last written sequence number for the writer identifier of another event of the segment group. Operation 1112 represents appending the event, the writer identifier and the sequence number to the selected sub-segment of the segment group.

Determining that the data segment of a data stream is to be subdivided can comprise detecting a scale-up event, and, in response to the detecting the scale-up event, determining that the number of routing keys associated with the data segment is below a defined subdividing threshold number.

Further operations can comprise associating the sequence number with metadata of the segment group as an updated last written sequence number for the writer identifier.

Determining the sequence number of the event for the writer identifier can comprise accessing the metadata to obtain the last written sequence number for the writer identifier, and determining, as the sequence number, a next sequence number relative to the last written sequence number for the writer identifier.

Further operations can comprise maintaining a last read sequence number associated with the segment group and the writer identifier, receiving a read request to read event data from the segment, in response to the read request, selecting a reading sub-segment from the segment group, reading a next read event from the reading sub-segment, and obtaining an associated sequence number and a writer identifier of the next read event, determining, based on the last read sequence number and the writer identifier, whether the associated sequence number of the next read event is a subsequent sequence number relative to the last read sequence number associated with the writer identifier, and in response to the associated sequence number of the next read event being determined to be the subsequent sequence number associated with the writer identifier, returning the event data of the next read event to the caller, and updating the last read sequence number associated with the writer identifier to the subsequent sequence number, and in response to the associated sequence number of the next read event being determined not to be the subsequent sequence number associated with the writer identifier, adding the event data of the next read event to a data structure in association with the sequence number of the next read event and the writer identifier.

Figure 12:
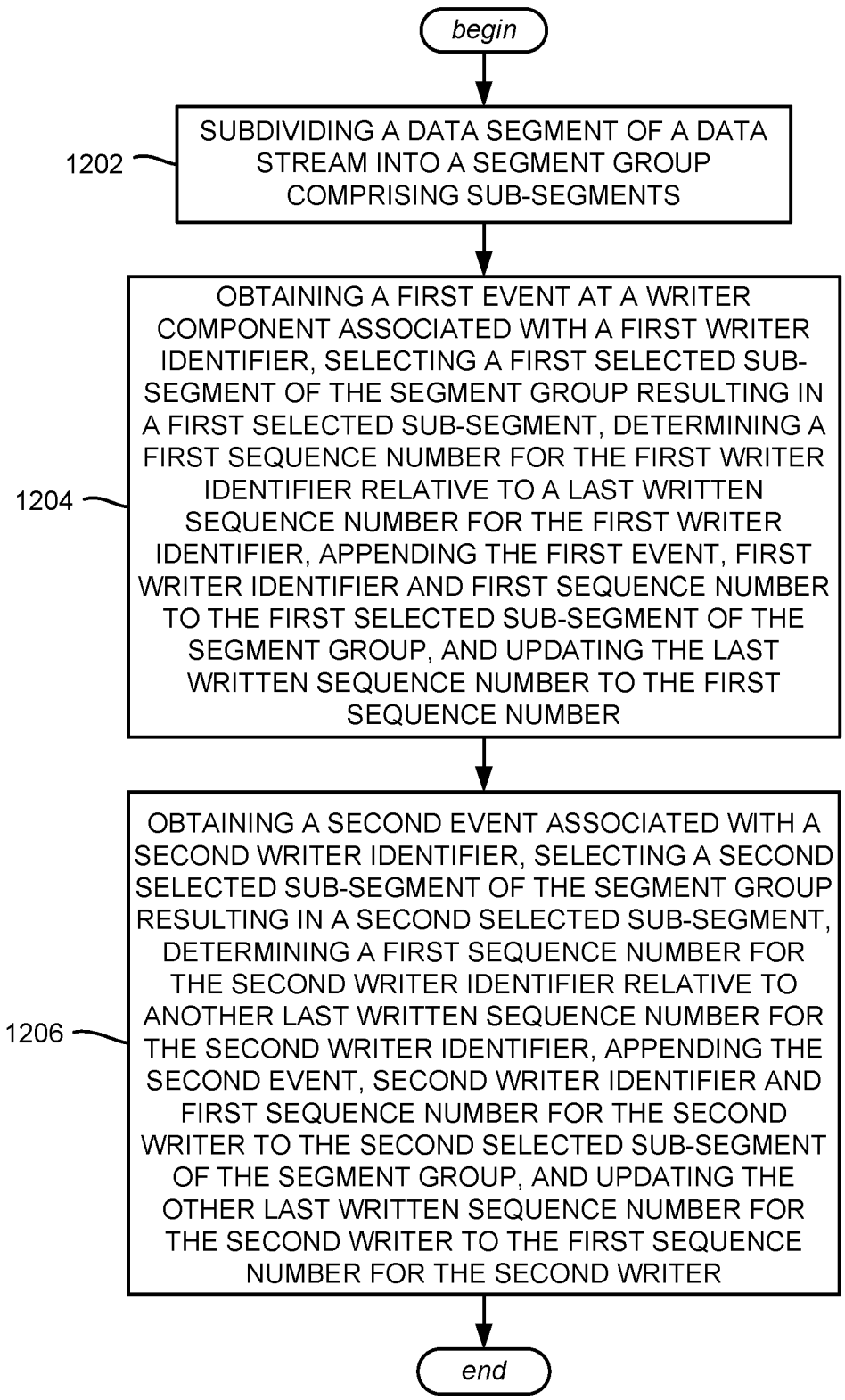
FIG. 12 is a flow diagram showing example operations related to subdividing a segment into a segment group and appending events from different writers to the segment group, in accordance with various aspects and implementations of the subject disclosure.

FIG. 12 summarizes various example operations, e.g., corresponding to a machine-readable storage medium, comprising executable instructions that, when executed by a processor of a streaming data storage system, facilitate performance of operations. Operation 1202 represents subdividing a data segment of a data stream into a segment group comprising sub-segments. Operation 1204 represents obtaining a first event at a writer component associated with a first writer identifier, selecting a first selected sub-segment of the segment group resulting in a first selected sub-segment, determining a first sequence number for the first writer identifier relative to a last written sequence number for the first writer identifier, appending the first event, first writer identifier and first sequence number to the first selected sub-segment of the segment group, and updating the last written sequence number to the first sequence number. Operation 1206 represents obtaining a second event associated with a second writer identifier, selecting a second selected sub-segment of the segment group resulting in a second selected sub-segment, determining a first sequence number for the second writer identifier relative to another last written sequence number for the second writer identifier, appending the second event, second writer identifier and first sequence number for the second writer to the second selected sub-segment of the segment group, and updating the other last written sequence number for the second writer to the first sequence number for the second writer.

The first selected sub-segment of the segment group can be a different sub-segment from the second selected sub-segment of the segment group.

Further operations can comprise obtaining a third event associated with the first writer identifier, selecting a third selected sub-segment of the segment group, determining a second sequence number for the first writer identifier, appending the third event, first writer identifier and second sequence number for the first writer identifier to the third selected sub-segment of the segment group, and updating the last written sequence number for the first writer identifier to the second sequence number.

Further operations can comprise receiving a request to read a next event associated with the first writer identifier, determining that the first writer identifier is associated with the segment group, selecting one segment of the segment group as a selected reading segment, obtaining a last read sequence number for the first writer identifier, reading a candidate event from the selected reading segment, determining whether the candidate event has a sequence number and the first writer identifier that indicates the candidate event is a next event for the first writer based on the sequence number relative to last read sequence number for the first writer, and in response to determining that the candidate event has a sequence number and first writer identifier that indicates the candidate event is a next event for the first writer, returning the candidate event in response to the request, and updating the last read sequence number to an updated last read sequence number for the first writer identifier to the sequence number of the candidate event.

The candidate event can have a sequence number and the first writer identifier can indicate that the candidate event is the next event for the first writer, and further operations can comprise accessing a data structure of one or more non-returned candidate events for the first writer, determining whether a non-returned candidate event for the first writer has a subsequent next sequence number for the first writer identifier relative to the updated last read sequence number for the first writer identifier, and in response to determining that the non-returned candidate event for the first writer has the subsequent next sequence number for the first writer identifier, removing the non-returned candidate event from the data structure as a subsequent next event to return, returning the subsequent next event, and updating the last read sequence number to the sequence number of the subsequent next event.

As can be seen, the technology described herein practical to implement, and provides segment groups that help distribute traffic with the same routing key or small number of routing keys. This allows a data stream to better take advantage of the physical resources available in a cluster, particularly when the user-provided routing keys are not sufficiently granular enough to distribute traffic using the traditional scaling approach. The technology needs only a relatively small amount of metadata overhead, and writer and readers can seamlessly transition to/from segment Groups without affecting the flow of data or any consistency and ordering guarantees of data streams.

Figure 13:
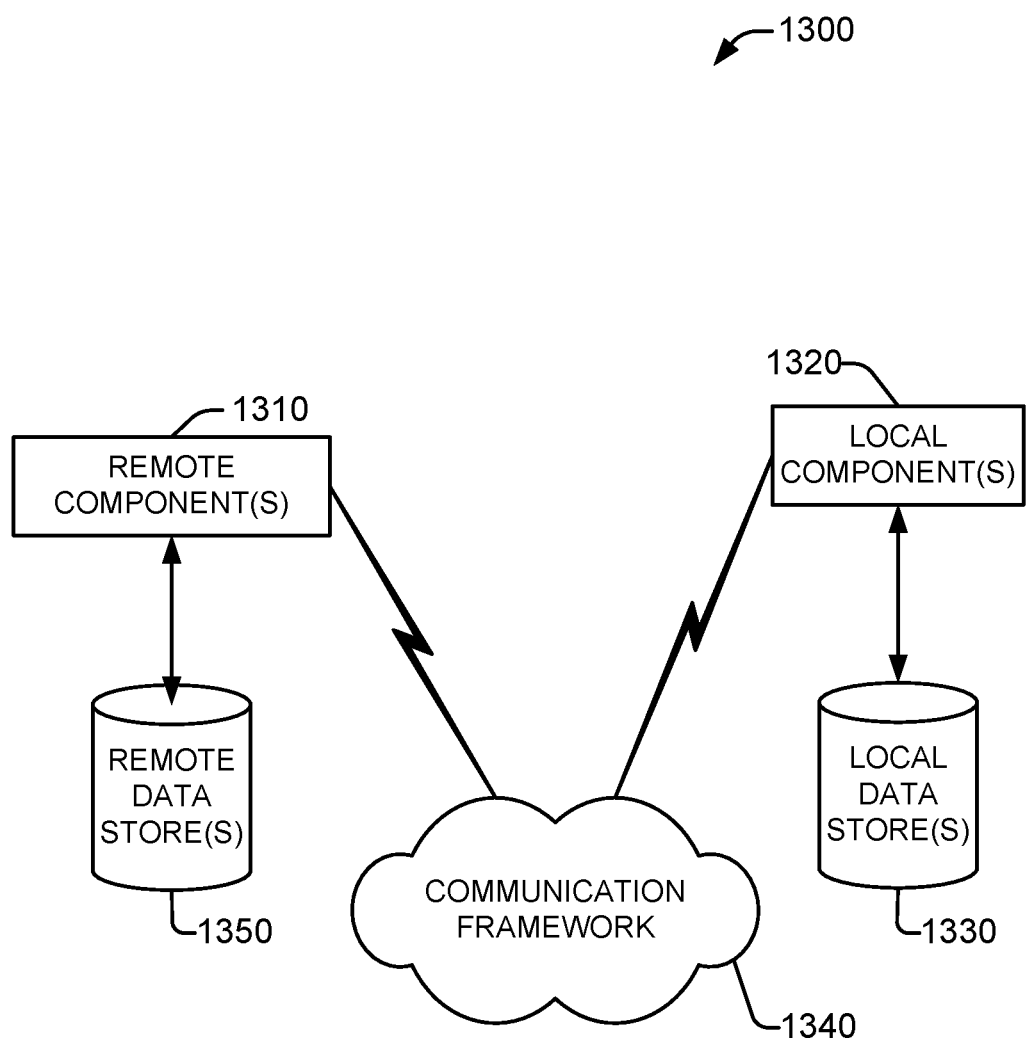
FIG. 13 is a block diagram representing an example computing environment into which aspects of the subject matter described herein may be incorporated.

FIG. 13 is a schematic block diagram of a computing environment 1300 with which the disclosed subject matter can interact. The system 1300 comprises one or more remote component(s) 1310. The remote component(s) 1310 can be hardware and/or software (e.g., threads, processes, computing devices). In some embodiments, remote component(s) 1310 can be a distributed computer system, connected to a local automatic scaling component and/or programs that use the resources of a distributed computer system, via communication framework 1340. Communication framework 1340 can comprise wired network devices, wireless network devices, mobile devices, wearable devices, radio access network devices, gateway devices, femtocell devices, servers, etc.

The system 1300 also comprises one or more local component(s) 1320. The local component(s) 1320 can be hardware and/or software (e.g., threads, processes, computing devices). In some embodiments, local component(s) 1320 can comprise an automatic scaling component and/or programs that communicate/use the remote resources 1310 and 1320, etc., connected to a remotely located distributed computing system via communication framework 1340.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The system 1300 comprises a communication framework 1340 that can be employed to facilitate communications between the remote component(s) 1310 and the local component(s) 1320, and can comprise an air interface, e.g., Uu interface of a UMTS network, via a long-term evolution (LTE) network, etc. Remote component(s) 1310 can be operably connected to one or more remote data store(s) 1350, such as a hard drive, solid state drive, SIM card, device memory, etc., that can be employed to store information on the remote component(s) 1310 side of communication framework 1340. Similarly, local component(s) 1320 can be operably connected to one or more local data store(s) 1330, that can be employed to store information on the local component(s) 1320 side of communication framework 1340.

Figure 14:
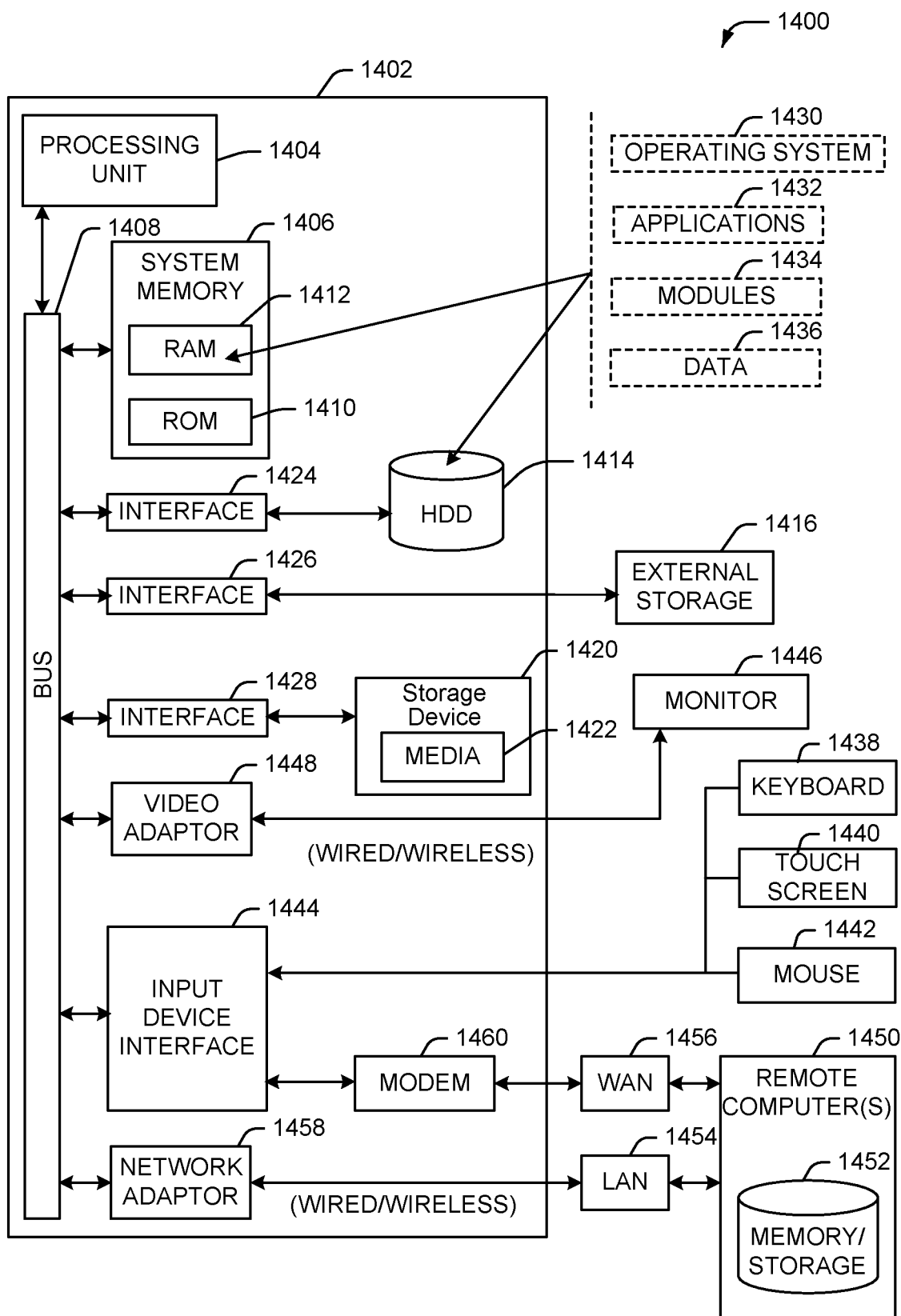
FIG. 14 depicts an example schematic block diagram of a computing environment with which the disclosed subject matter can interact/be implemented at least in part, in accordance with various aspects and implementations of the subject disclosure.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), and can include one or more external storage devices 1416 (e.g., a magnetic floppy disk drive (FDD) 1416, a memory stick or flash drive reader, a memory card reader, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414.

Other internal or external storage can include at least one other storage device 1420 with storage media 1422 (e.g., a solid state storage device, a nonvolatile memory device, and/or an optical disk drive that can read or write from removable media such as a CD-ROM disc, a DVD, a BD, etc.). The external storage 1416 can be facilitated by a network virtual machine. The HDD 1414, external storage device(s) 1416 and storage device (e.g., drive) 1420 can be connected to the system bus 1408 by an HDD interface 1424, an external storage interface 1426 and a drive interface 1428, respectively.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   a processor; and
   a memory that stores executable instructions that, when executed by the processor, facilitate performance of operations, the operations comprising:
   subdividing a segment of a data stream into a segment group of sub-segments;
   receiving an event at a writer component from an upstream application to append to the segment;

selecting a sub-segment from the segment group, resulting in a selected sub-segment;
appending the event to the selected sub-segment; and
maintaining data in association with the event that represents a writer identifier of the writer component and a sequence number of the event that is relative to other sequence numbers of other events appended to the sub-segments of the segment group.

2. The system of claim 1, wherein the selecting the sub-segment from the segment group comprises alternating between sub-segments of the segment group per event.

3. The system of claim 1, wherein the selecting the sub-segment from the segment group comprises alternating between sub-segments of the segment group for batches of events.

4. The system of claim 1, wherein the operations further comprise atomically sealing the sub-segments of the segment group in conjunction with a merge operation.

5. The system of claim 1, wherein the operations further comprise:
maintaining a last read sequence number associated with the segment group and the writer identifier,
receiving a read request to read event data from the segment,
in response to the read request,
selecting a reading sub-segment from the segment group,
reading a next read event from the reading sub-segment, and
obtaining an associated sequence number and writer identifier of the next read event,
determining, based on the last read sequence number, whether the associated sequence number of the next read event is a subsequent sequence number relative to the last read sequence number associated with the writer identifier, and
in response to the associated sequence number of the next read event being the subsequent sequence number associated with the writer identifier,
returning the event data of the next read event to the caller, and
updating the last read sequence number associated with the writer identifier to the subsequent sequence number.

6. The system of claim 5, wherein the reading sub-segment is a first reading sub-segment, wherein the next read event is a first next read event, wherein the sequence number of the first next read event is a first sequence number associated with the writer identifier, wherein the associated sequence number is an associated first sequence number, and wherein the operations further comprise:
in response to the associated first sequence number of the first next read event not being the first next sequence number associated with the writer identifier,
maintaining the event data of the first next read event in a data structure in association with the first sequence number and the writer identifier,
selecting a second reading sub-segment from the segment group,
reading a second next read event from the second reading sub-segment, and
obtaining an associated second sequence number of the second next read event,
determining, based on the last read sequence number, whether the associated second sequence number of the second next read event is a subsequent sequence number relative to the last read sequence number associated with the writer identifier, and
in response to the associated second sequence number of the second next read event being the subsequent sequence number associated with the writer identifier,
returning the event data of the second next read event to the caller, and
updating the last read sequence number associated with the writer identifier to an updated last read sequence number sequence number based on the second sequence number.

7. The system of claim 6, wherein the associated first sequence number of the first next read event is not the subsequent sequence number associated with the writer identifier, and wherein the operations further comprise:
accessing the data structure to determine whether the associated first sequence number associated with the writer identifier of the first next read event is a subsequent sequence number associated with the writer identifier relative to the updated last read sequence number associated with the writer identifier, and
in response to the associated first sequence number of the first next read event being the subsequent sequence number associated with the writer identifier relative to the updated last read sequence number associated with the writer identifier,
returning event data of the first next read event in further response to the read request,
removing the first next read event from the data structure, and
updating the last read sequence number associated with the writer identifier to a next updated last read sequence number sequence number associated with the writer identifier based on the first sequence number.

8. The system of claim 6, wherein the associated first sequence number associated with the writer identifier of the first next read event is not the subsequent sequence number associated with the writer identifier, and wherein the operations further comprise:
receiving a subsequent read request,
accessing the data structure to determine whether the associated first sequence number associated with the writer identifier of the first next read event is a subsequent sequence number associated with the writer identifier relative to the updated sequence number associated with the writer identifier, and
in response to the associated first sequence number of the first next read event being the subsequent sequence number associated with the writer identifier relative to the updated sequence number,
returning event data of the first next read event in a subsequent response to the subsequent read request,
removing the first next read event from the data structure, and
updating the last read sequence number associated with the writer identifier to a next updated last read sequence number associated with the writer identifier based on the first sequence number associated with the writer identifier.

9. The system of claim 1, wherein the subdividing the segment into the segment group comprises subdividing the segment in response to determining that an event quantity ingestion rate is greater than an event quantity ingestion rate threshold value or that an event size ingestion rate is greater than an event size ingestion rate threshold value, and that a number of distinct routing keys that map to the segment is less than a defined routing keys threshold number.

10. The system of claim 9, wherein the defined routing keys threshold number is obtained from policy data associated with the data segment.

11. A method, comprising:
determining, by a streaming data storage system comprising a processor, that a data segment of a data stream is to be subdivided based on a number of routing keys associated with the data segment;
in response to the determining, subdividing the data segment into a segment group, the segment group comprising multiple sub-segments;
obtaining an event at a writer component associated with a writer identifier;
selecting a sub-segment of the segment group, resulting in a selected sub-segment;
determining a sequence number of the event for the writer identifier relative to a last written sequence number for the writer identifier of another event of the segment group; and
appending the event, the writer identifier and the sequence number to the selected sub-segment of the segment group.

12. The method of claim 11, wherein the determining that the data segment of a data stream is to be subdivided comprises detecting a scale-up event, and, in response to the detecting the scale-up event, determining that the number of routing keys associated with the data segment is below a defined subdividing threshold number.

13. The method of claim 11, further comprising associating the sequence number with metadata of the segment group as an updated last written sequence number for the writer identifier.

14. The method of claim 13, wherein the determining the sequence number of the event for the writer identifier comprises accessing the metadata to obtain the last written sequence number for the writer identifier, and determining, as the sequence number, a next sequence number relative to the last written sequence number for the writer identifier.

15. The method of claim 13, further comprising:
maintaining a last read sequence number associated with the segment group and the writer identifier,
receiving a read request to read event data from the segment,
in response to the read request,
  selecting a reading sub-segment from the segment group,
  reading a next read event from the reading sub-segment, and
  obtaining an associated sequence number and a writer identifier of the next read event,
determining, based on the last read sequence number and the writer identifier, whether the associated sequence number of the next read event is a subsequent sequence number relative to the last read sequence number associated with the writer identifier, and
in response to the associated sequence number of the next read event being determined to be the subsequent sequence number associated with the writer identifier, returning the event data of the next read event to the caller, and
updating the last read sequence number associated with the writer identifier to the subsequent sequence number, and
in response to the associated sequence number of the next read event being determined not to be the subsequent sequence number associated with the writer identifier, adding the event data of the next read event to a data structure in association with the sequence number of the next read event and the writer identifier.

16. A non-transitory machine-readable medium, comprising executable instructions that, when executed by a processor of a streaming data storage system, facilitate performance of operations, the operations comprising:
subdividing a data segment of a data stream into a segment group comprising sub-segments;
obtaining a first event at a writer component associated with a first writer identifier, selecting a first sub-segment of the segment group resulting in a first selected sub-segment, determining a first sequence number for the first writer identifier relative to a last written sequence number for the first writer identifier, appending the first event, first writer identifier and first sequence number to the first selected sub-segment of the segment group, and updating the last written sequence number to the first sequence number; and
obtaining a second event associated with a second writer identifier, selecting a second sub-segment of the segment group resulting in a second selected sub-segment, determining a first sequence number for the second writer identifier relative to another last written sequence number for the second writer identifier, appending the second event, second writer identifier and first sequence number for a second writer to the second selected sub-segment of the segment group, and updating the other last written sequence number for the second writer to the first sequence number for the second writer.

17. The non-transitory machine-readable medium of claim 16, wherein the first selected sub-segment of the segment group is a different sub-segment from the second selected sub-segment of the segment group.

18. The non-transitory machine-readable medium of claim 16, wherein the operations further comprise obtaining a third event associated with the first writer identifier, selecting a third selected sub-segment of the segment group, determining a second sequence number for the first writer identifier, appending the third event, first writer identifier and second sequence number for the first writer identifier to the third selected sub-segment of the segment group, and updating the last written sequence number for the first writer identifier to the second sequence number.

19. The non-transitory machine-readable medium of claim 16, wherein the operations further comprise receiving a request to read a next event associated with the first writer identifier, determining that the first writer identifier is associated with the segment group, selecting one segment of the segment group as a selected reading segment, obtaining a last read sequence number for the first writer identifier, reading a candidate event from the selected reading segment, determining whether the candidate event has a sequence number and the first writer identifier that indicates the candidate event is a next event for a first writer based on the sequence number relative to last read sequence number for the first writer, and in response to determining that the candidate event has a sequence number and first writer identifier that indicates the candidate event is a next event for the first writer, returning the candidate event in response to the request, and updating the last read sequence number to an updated last read sequence number for the first writer identifier to the sequence number of the candidate event.

20. The non-transitory machine-readable medium of claim 19, wherein the candidate event has a sequence number and the first writer identifier that indicates the candidate event is the next event for a first writer, and wherein the operations further comprise accessing a data structure of one or more non-returned candidate events for the first writer, determining whether a non-returned candidate event for the first writer has a subsequent next sequence number for the first writer identifier relative to the updated last read sequence number for the first writer identifier, and in response to determining that the non-returned candidate event for the first writer has the subsequent next sequence number for the first writer identifier, removing the non-returned candidate event from the data structure as a subsequent next event to return, returning the subsequent next event, and updating the last read sequence number to the sequence number of the subsequent next event.

* * * * *